(12) United States Patent
Bugenhagen (10) Patent No.: US 8,745,702 B2
(45) Date of Patent: *Jun. 3, 2014

(54) SYSTEM AND METHOD FOR MANAGING ACCESS TO A NETWORK INTERFACE DEVICE

(71) Applicant: CenturyLink Intellectual Property LLC, Denver, CO (US)

(72) Inventor: Michael K. Bugenhagen, Overland Park, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/021,986

(22) Filed: Sep. 9, 2013

(65) Prior Publication Data

US 2014/0013402 A1    Jan. 9, 2014

Related U.S. Application Data

(63) Continuation of application No. 12/433,136, filed on Apr. 30, 2009, now Pat. No. 8,533,784.

(51) Int. Cl.
    *G06F 21/00* (2013.01)
(52) U.S. Cl.
    USPC ............... 726/4; 726/29; 709/220; 709/229

(58) Field of Classification Search
    None
    See application file for complete search history.

(56) References Cited

U.S. PATENT DOCUMENTS

| | | |
|---|---|---|
| 7,246,159 B2 | 7/2007 | Aggarwal et al. |
| 7,406,473 B1 | 7/2008 | Brassow et al. |
| 7,464,152 B2 | 12/2008 | Ishizaki et al. |
| 7,698,580 B2 | 4/2010 | Schindler et al. |
| 7,913,080 B2 | 3/2011 | Taniguchi et al. |
| 2002/0143920 A1 | 10/2002 | Dev et al. |
| 2005/0010657 A1 | 1/2005 | Yamada et al. |
| 2005/0071446 A1 | 3/2005 | Graham et al. |
| 2005/0277434 A1 | 12/2005 | Tuomi et al. |
| 2006/0010213 A1 | 1/2006 | Mehta |
| 2006/0165103 A1 | 7/2006 | Trudeau et al. |
| 2007/0081471 A1 | 4/2007 | Talley et al. |
| 2007/0110010 A1 | 5/2007 | Kotola et al. |
| 2009/0122787 A1 | 5/2009 | Huotari et al. |

*Primary Examiner* — Jung Kim
*Assistant Examiner* — Tri Tran
(74) *Attorney, Agent, or Firm* — Swanson & Bratschun, L.L.C.

(57) ABSTRACT

A system and method for managing control of a network interface device. Permissions for management of a NID are established. The permissions enable a user to deny a third party access to one or more portions of the NID. Access for the third party to the one or more portions of the NID are granted in response to receiving an authorized override command from the third party. Activities performed by the third party are logged by the one or more portions of the mid-in response to receiving the authorized override command from the third party.

20 Claims, 6 Drawing Sheets

SYSTEM AND METHOD FOR MANAGING ACCESS TO A NETWORK INTERFACE DEVICE

CROSS REFERENCE TO RELATED APPLICATIONS

This application is a Continuation of U.S. patent application Ser. No. 12/433,136 filed on Apr. 30, 2009 entitled SYSTEM AND METHOD FOR SEPARATING CONTROL OF A NETWORK INTERFACE DEVICE the entire teachings of which are incorporated herein.

BACKGROUND OF THE INVENTION

The use of and development of communications has grown nearly exponentially in recent years. The growth is fueled by larger networks with more reliable protocols and better communications hardware available to service providers and consumers. In many cases, customers operate extensive equipment, connections, systems, facilities, and devices. In some cases, it is difficult to diagnose, troubleshoot, and repair communications problems between a service provider and the customer.

BRIEF SUMMARY OF THE INVENTION

One embodiment provides a system and method for separating management of a network interface device. Permissions for management of a NID are established. The permissions enable a user to deny a third party access to one or more portions of the NID. Access for the third party to the one or more portions of the NID are granted in response to receiving an authorized override command from the third party. Activities performed by the third party are logged by the one or more portions of the mid-in response to receiving the authorized override command from the third party.

Another embodiment provides a network interface device. The network interface device may include a management channel for communicating with a user and a third parties. The network interface device may further include management logic in communication with the management channel. The management logic may include a user controller operable to control operation of one or more portions of the NID. The user controller is configured by the user to set restrictions for the one or more portions including restricting access to the one or more portions of the NID by the third parties. The management logic may further include a log operable to log activities associated with one of the third parties overriding the restrictions.

Yet another embodiment provides a NID. The NID may include a processor operable to execute a set of instructions and a memory in communication with the processor. The memory may be operable to store the set of instructions. The set of instructions may be executed to establish permissions for management of the one or more ports of the NID based on input from the user, restrict access to the one or more ports based on the user input, grant access for the third party to the one or more ports of the NID in response to receiving an override request from the third party, log activities performed by the third party in the one or more ports of the NID in response to receiving the override request, and communicate the logged activities to at least the user.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE INVENTION

Illustrative embodiments provide a small form pluggable (SFP) and method for performing network or connection analysis, testing, or measurement utilizing the SFP once inserted in a customer premise equipment (CPE) device of a user. The SFP or SFP module may allow a communications service provider to remotely perform functions and services that in the past may have required a truck roll, for example, sending a network operator or technician to the location of the CPE device. The SFP may also be utilized by out-of-franchise 3rd party service providers. The SFP may include operational functions normally included in an Ethernet maintenance entity point.

Another illustrative embodiment provides a network interface device (NID) operable to allow a user to manage and control a partition of the NID. The NID is a device that governs flow of communications of packets between networks or portions of networks. The user may also be referred to herein as a tenant or customer that has an agreement with a service provider to utilize a portion of the NID. The user may have purchased, rented, or leased access to the NID or may have another type of agreement with the owning service provider. The user has lock out ability over the service provider, super user, administrator, or owning party. The operational lock outs provide greater confidence and any intrusion by the service provider is logged for review by the user.

Figure 1:
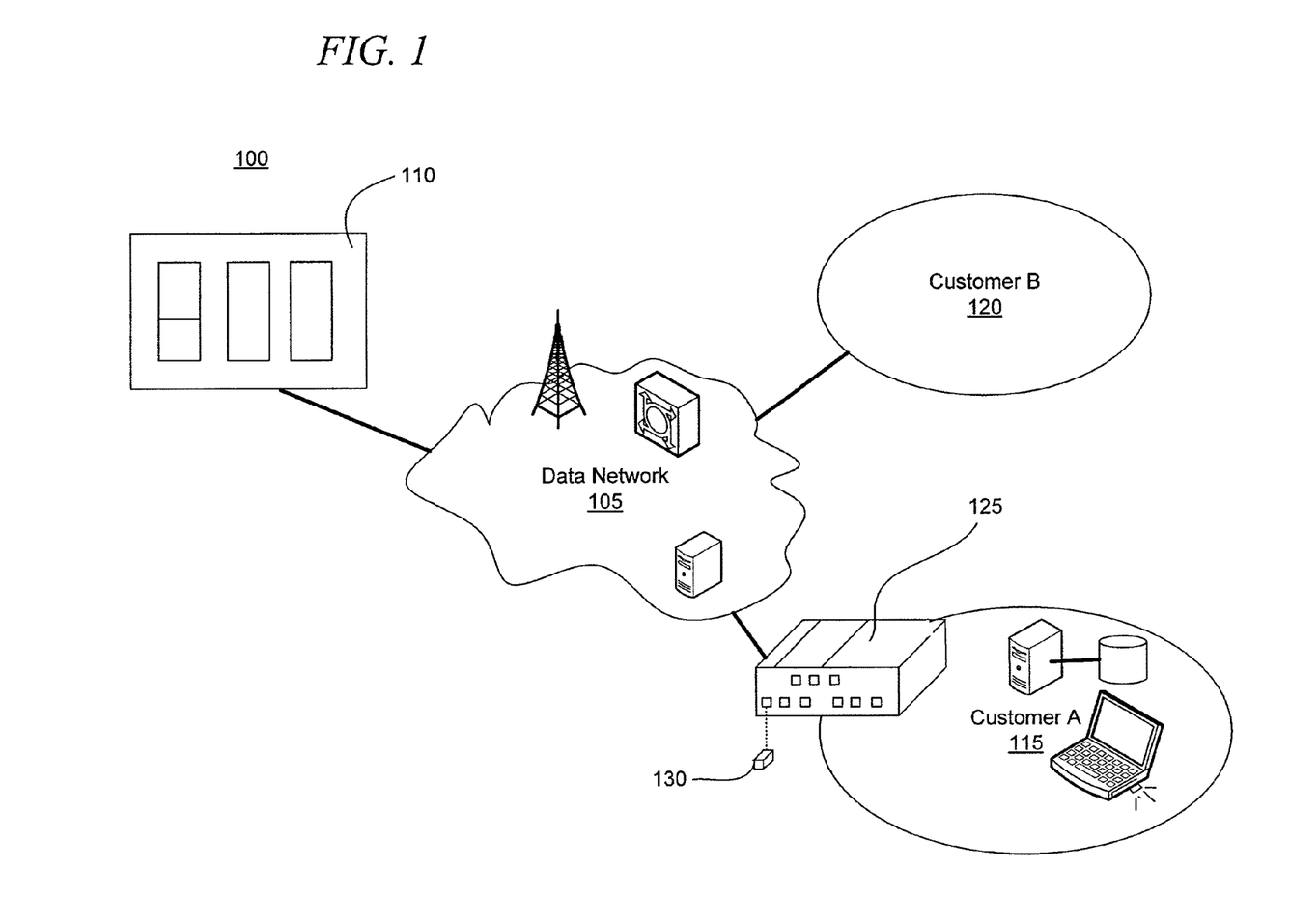
FIG. 1 is a pictorial representation of a communications environment in accordance with an illustrative embodiment.

FIG. 1 is a pictorial representation of a communications environment in accordance with an illustrative embodiment. The communications environment 100 is an embodiment of a communications network, systems, and devices utilized between one or more communications service providers and one or more customers or other users. In an illustrative embodiment, the communications environment 100 may include a data network 105, a communications management system 110, customer A 115, customer B 120, CPE device 125, and the SFP 130.

Communications within the communications environment 100 may occur on any number of networks which may include wireless networks, data or packet networks, cable networks, satellite networks, private networks, publicly switched telephone networks (PSTN), the data network 105, or other types of communication networks. The data network 105 is an infrastructure for sending and receiving data, messages, packets, and signals according to one or more designated formats, standards, and protocols. The data network 105 may represent a single communication service provider or multiple communications services providers. In one embodiment, the communications environment 100 is a metro Ethernet network utilizing any number of topologies and including various nodes, entities, switches, servers, UNIs, CPE devices, NIDs, and other communication elements.

The data network 105 may include any number of devices, systems, and equipment. The data network 105 may enable data and voice communications. The elements of the data network 105 may communicate using a signal control protocol, such as a simple network management protocol (SNMP) or a signaling system number 7 (SS7) protocol or TCP/IP protocols. The SS7 protocol or similar protocols are used to establish connections between switches, perform out-of-band signaling in support of the communications, billing, routing, and implementing information-exchange functions of the data network 105. In one embodiment, the various forms of management channels including, SNMP and Internet Protocol security (IPSEC) tunnels, may utilize any number of inherent security functions.

The communications management system 110 is one or more devices utilized to provision, retrieve data, test, activate, enable, initiate, route, and manage communications for one or more network devices. The communications management system 110 may include one or more devices networked to manage the data network 105. For example, the communications management system 110 may include any number of servers, routers, switches, or advanced intelligent devices. The communications network 110 may send and receive the electronic signals through any number of transmission mediums. The communications network 110 may include various fiber optics, cables, transmission towers, antennas, or other elements for transmitting communications to the connected devices.

As Ethernet services and circuits replace those of TDM within the communications environment 100, a replacement for standard demarcation devices are also needed. A demarcation device may allow a service provider to monitor and troubleshoot circuits all the way to a specified demarcation point, such as the CPE device or NID. One embodiment of a demarcation device is a pluggable module. The pluggable module is a transceiver that may be utilized with the CPE device 125. The pluggable module may be the SFP as described herein. However, the pluggable module may include any number of devices suitable for integration with the CPE device 125 and demarcation functionality including a gigabit interface converter (GBIC), 10 gigabit SFP (XFP), and other equivalent devices.

The SFP 130 is a compact, hot-pluggable transceiver that may be utilized for both telecommunication and data communications applications. Hot pluggable or hot plugging indicates devices that are operable to be added or removed from a device or system without shutting down or otherwise interrupting the system. For example, once added, the SFP 130 may immediately interact with the hardware and operating system of the CPE device 125. As further illustrated in FIG. 2, the SFP 130 may interface the CPE device 125, such as switch, router, media converter, or other similar device to a fiber optic or copper networking cable. The SFP 130 utilizes a standardized industry format to encourage interoperability. The SFP 130 may support communication standards, such as SONET, Gigabit Ethernet, and Fiber Channel, and other communications standards. The illustrative embodiments may be utilized for any number of communications rates. In one embodiment, the SFP 130 may be a light-to-electrical transceiver that provides an interface between a customer network and a service provider network.

The communications management system 110 may perform testing and management for a connection or link between the data network 105, customer A 115, and customer B 120. In particular, the communications management system 110 may perform testing as implemented through the SFP 130 when integrated with the CPE device 125. The tests may include performing loop back tests between the SFP 130 and the data network 105 or the communications management system 110. The communications management system 110 may measure frame loss, discarded traffic, throughput, and other traffic information between the SFP 130, the CPE 125 and the data network 105. The SFP 130 provides a simplified system and method for implementing demarcation between a service provider and a customer, as well as various features and services.

Figure 2:
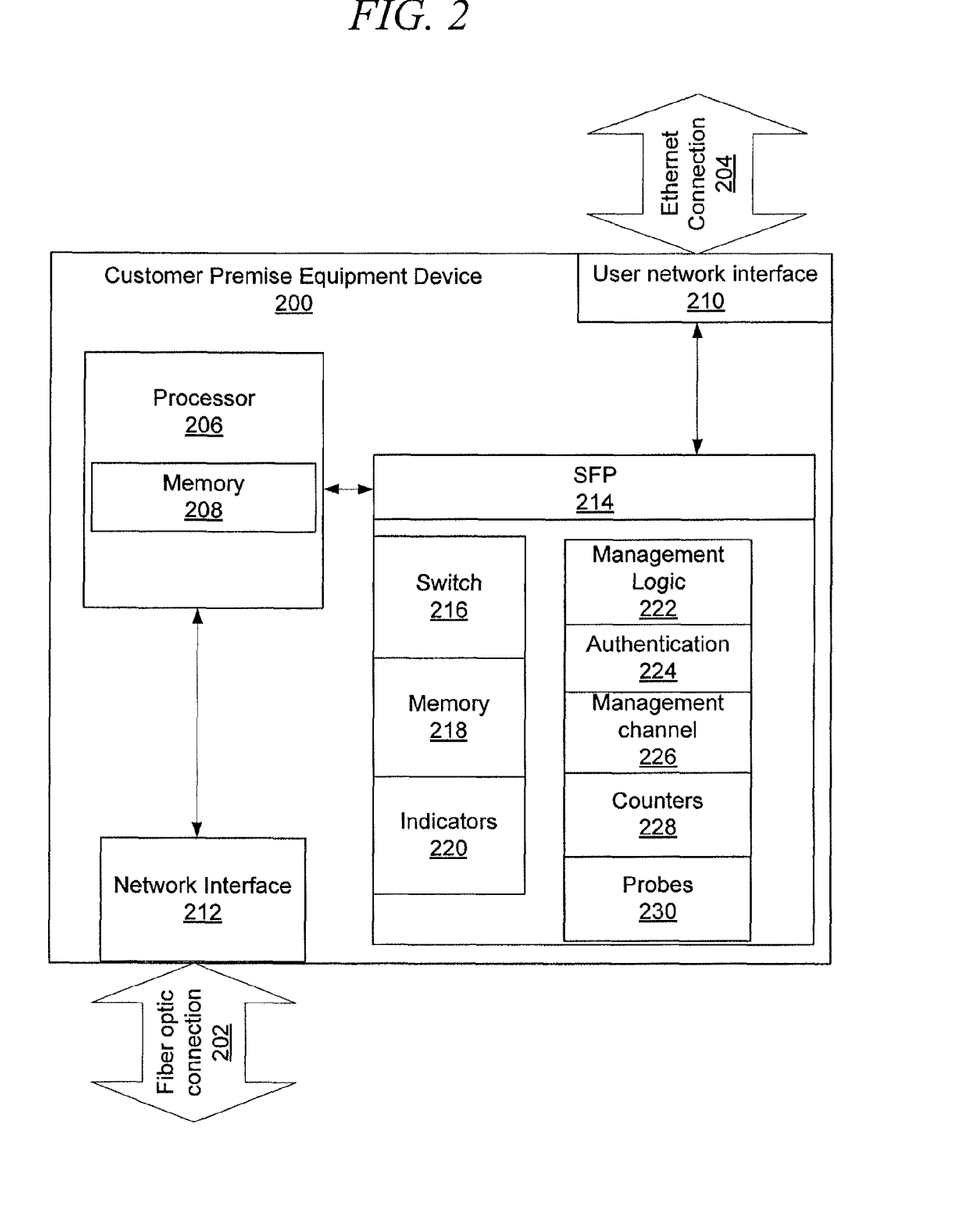
FIG. 2 is a block diagram of customer premise equipment in accordance with an illustrative embodiment.

FIG. 2 is a block diagram of customer premise equipment in accordance with an illustrative embodiment. FIG. 2 illustrates an embodiment of a CPE device 200. The CPE device 200 may be a router, switch, edge device, interface, or other device separating a service provider network and the customer network, system, or devices. The CPE device 200 may communicate with one or more networks through a fiber optic connection 202 and an Ethernet connection 204. The CPE device 200 may include a processor 206, a memory 208, a user network interface 210, a network interface 212, an SFP 214, a switch 216, a memory 218, indicators 220, management logic 222, authenticator 224, management channel 226, counters 228, and probes 230.

The CPE device 200 may communicate with any number of networks. In one embodiment, the CPE device 200 may communicate with the networks through the fiber optic connection 202 and the Ethernet connection 204. In another embodiment, both connections may be fiber optics or may utilize other communications standards, mediums, or processes. In one embodiment, the CPE device 200 may communicate with the service provider through the fiber optic connection. Similarly, the CPE device 200 may communicate with a customer network, equipment, or systems through the Ethernet connection 204. The CPE 200 may include any number of computing and telecommunications components, devices, or elements which may include busses, motherboards, circuits, ports, interfaces, cards, connections, converters, adapters, transceivers, displays, antennas, and other similar components.

The network interface 212 is an interface for enabling communication between a service provider network with the CPE device 200. The user network interface 210 is an interface for enabling communication between the customer's network, equipment, or systems and the CPE device 200.

The processor 206 is circuitry or logic enabled to control execution of a set of instructions. The processor 206 may be a microprocessor, digital signal processor, application-specific integrated circuit (ASIC), central processing unit, or other device suitable for controlling an electronic device, including one or more hardware and software elements, executing software, instructions, programs and applications, converting and processing signals and information, and performing other related tasks. The processor 206 may be a single chip or integrated with other computing or communications elements.

The memory 208 is a hardware element, device, or recording media configured to store data for subsequent retrieval or access at a later time. The memory 208 may be static or dynamic memory. The memory 208 may include a hard disk, random access memory, cache, removable media drive, mass storage, or configuration suitable as storage for data, instructions, and information. In one embodiment, the memory 208 and processor 206 may be integrated. The memory may use any type of volatile or non-volatile storage techniques and mediums.

The switch 216 is an electronic component for generating or breaking a communication connection. In one embodiment, the switch 216 generates a loop back connection from the SFP 200 to the service provider through the fiber optic connection 202. The memory 218 may be a solid state memory. In one embodiment, the memory 218 is a flash memory.

The indicators 220 are user interfaces for communicating information to a user or network operator. The indicators 220 may include light emitting diodes (LEDs), a screen, or other output interfaces. For example, the indicators 220 may indicate by flashing a red LED, sending an email, displaying a message, generating an alarm indication signal (AIS), or other such indication when packets are dropped at the SFP 214 because the available bandwidth through the fiber optic connection 202 is exceeded. The indicators 220 may also provide other details or information to a technician, user, or other network operator for diagnosing network conditions.

The management logic 222 is logic operable to control operation of the SFP 214. In one embodiment, the management logic 222 is an application specific integrated circuit (ASIC). The ASIC may incorporate all of the logic, circuits, and elements of the SFP in one embodiment. In another embodiment, the management logic 222 is a field programmable gate array (FPGA). The ASIC or FPGA may be utilized in a uniform format enabling multiple manufacturers to produce the SFP 214 for multiple service providers and customers. In one embodiment, the management logic 222 may utilize a management protocol, such as 802.1X a simple network management protocol (SNMP). In another embodiment, specific service provider addressing, routing, or security mechanisms may be integrated into the logic or hardware to ensure only the owning service provider has In an illustrative embodiment, the management logic 222 may associate a profile for a communications service, the service provider, or the customer with the SFP 214. For example, the profile may specify that a port associated with the SFP 214 is designated for Fast Ethernet or Gigabit service. In one embodiment, the management logic 222 may utilize a management protocol, such as 802.1X, SNMP. The management logic 222 may send a message to a service provider indicating the port is associated with a user and authorizing service to the user.

The management logic 222 may be operable to perform any number of operations, administration, and maintenance (OAM) mechanisms to facilitate network operation and troubleshooting. For example, the management logic 222 may implement the features of the ITU-T Recommendation Y.1731 and IEEE 802.1ag.

The management channel 226 is a control standard or protocol for allowing a service provider to access and control the SFP 214. In one embodiment, the authentication may be performed through layer 2 or layer 3 based on the configuration of the CPE device 200 and the service provider network. In one embodiment, the management logic may utilize a specific address associated with the SFP 214 to authenticate a service provider. The address may be a MAC address, an IP address, or other similar network address. For example, a designated virtual local area network (VLAN) may be utilized to manage the SFP 214 and an associated port and nothing else. The management channel 226 may be utilized to verify that the SFP 214 has been installed at the port associated with the SFP 214 and is authorized to perform communications through a service provider connection or network.

The authenticator 224 is logic operable to determine that a service provider or other party is authorized to access the SFP 214. The authenticator 224 may also ensure that a provided indicator, identifier, key, VLAN, or password authorizes the service provider or other user to access the SFP 214. In one embodiment, the authenticator may be integrated with the management channel 226 or authorize communications through the management channel 226.

The counters 228 are elements for measuring service traffic and/or synthetic test packets. The counters 228 may measure the amount of packets sent and received. The results may be communicated to the service provider to measure throughput, packet loss, jitter, delay, monitor performance, and to otherwise ensure that service level agreements are being met.

The probes 230 are testing elements. In one embodiment, the probes 230 may generate synthetic traffic for testing the connection or network between the customer and the service provider. In another embodiment, the SFP 214 may include a rate limiter, a rate shaper, logic for adding and dropping VLAN tags, and status logic. The status logic may indicate the condition of the SFP 214 and the CPE device 200. The status logic may indicate information, such as utilization, loss, failures, overheating, and loss of power. In one embodiment, the status logic may include dying gasp logic and the SFP 214 or CPE device 200 may include a capacitor or battery configured to power the SFP 214 long enough to send a message to the service provider indicating the CPE device 200 or the SFP 214 is losing power or functionality.

Figure 3:
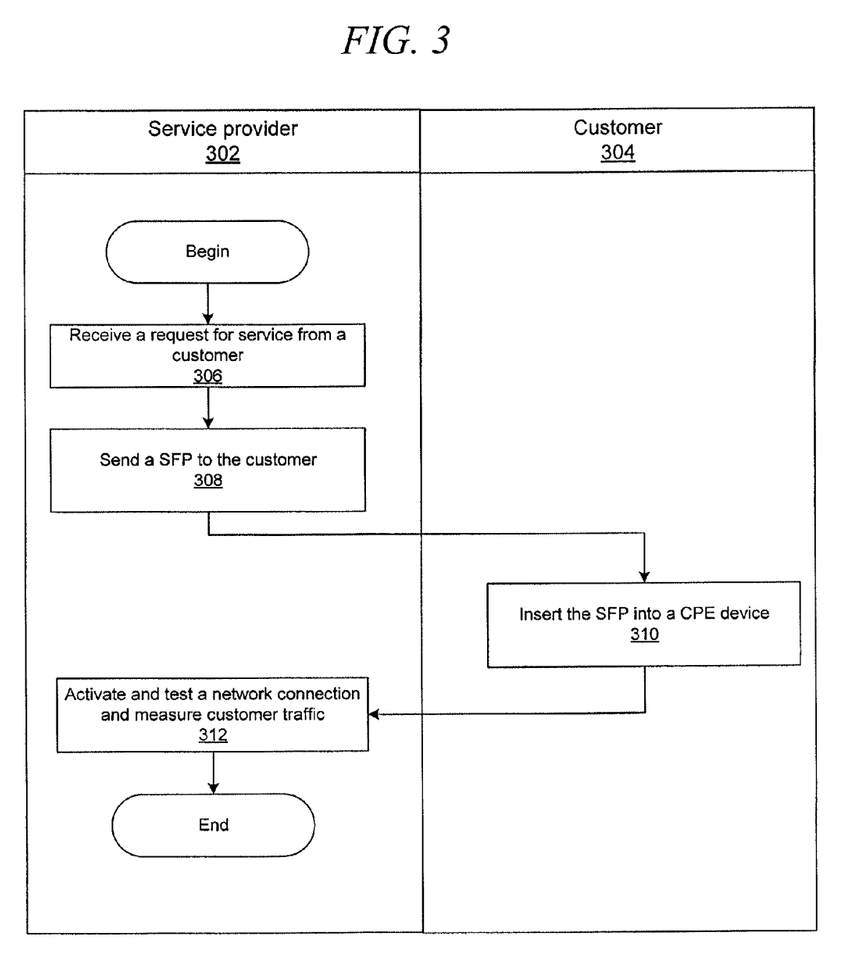
FIG. 3 is flowchart of a process for installing a small form pluggable (SFP) in accordance with an illustrative embodiment.

FIG. 3 is a flowchart of a process for installing the SFP in accordance with an illustrative embodiment. The process of FIG. 3 may be implemented by a service provider 302 and a customer 304. The service provider 302 may provide, facilitate, or manage any number of communications services utilized by the customer 304. The process may begin with the service provider 302 receiving a request for service from a customer (step 306). The request for service may include activation of a circuit, network, connection, or service. The request may be received telephonically or electronically through an automated system or in any number of ways. In one embodiment, the SFP applicable to the customer 304 or user may be selected, programmed, or manufactured. For example, a specialized ASIC within the SFP may be utilized for a Gb service to a customer 304 whereas a FPGA may be programmed within another SFP for a 10 Mb service for another customer.

The service provider 302 sends the SFP to the customer 304 (step 306). In one embodiment, the customer is a $3^{rd}$ party access provider acting as another service provider. The SFP may be sent utilizing a manual or automatic process. In one embodiment, the SFP may be sent from the service provider 302 to the customer 304 utilizing an automated packaging and delivery process and/or mechanisms. In another embodiment, the SFP may be selected, packaged, and shipped based on manual input.

Next, the customer 304 inserts the SFP into a CPE device (step 310). The SFP may act as a port module that may be inserted into a port of the CPE device. The port and port module may include a standard size, shape, interface protocol, and electrical connections that both power the SFP and integrate functionality of the SFP with the CPE device. The standardization between the SFP and CPE device may allow any number of SFP and CPE device types, brands, and configurations to be utilized interchangeably.

In one embodiment, the CPE device may be a router, switch, or other CPE device or system operated by the customer 304. For example, the CPE device may be an edge device within a network operated by the customer 304, such as for a building or campus. The insertion of the SFP may allow the service provider 302 to manage a port and provide a domain for the service provider 302 to manage within the larger CPE device.

Next, the service provider 302 activates and tests a network connection and measures customer traffic (step 312). The network connection may be a connection or transmission medium, such as a fiber optic, cable, T1, DSL connection, Ethernet or other communication connection, standard, or protocol. The network connection may be tested by the SFP performing a loop back from the CPE device of the customer 304 to a managing system or device of the service provider 302. The SFP may also measure customer traffic by determining the amount of traffic sent and received by the customer 304. For example, the service provider 302 may utilize the SFP to monitor packet communication, attempted, actual packets communicated, packets dropped, and other statistical information about communications to and from the customer 304.

The SFP may allow multiple service providers to interface when the CPE device is owned by a first service provider and the SFP is provided by a second service provider. In one embodiment, the SFP may send messages and indicators regarding the status of the applicable port, CPE device, and other integrated components. In one embodiment, the SFP may be configured to perform traffic or rate shaping or limiting. The SFP may also be configured to add or drop VLAN tags. VLAN tags are labels inserted into a frame by an originating device or point or relaying bridge. The VLAN tag may identify a VLAN association of a communication.

Figure 4:
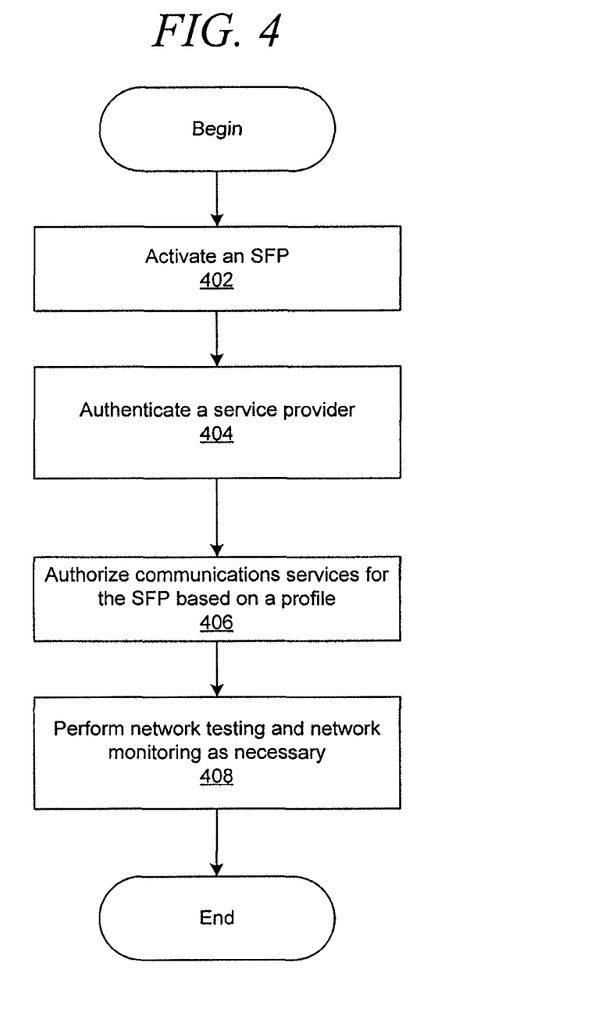
FIG. 4 is a flowchart of a process for utilizing the SFP in accordance with an illustrative embodiment.

FIG. 4 is a flowchart of a process for utilizing the SFP in accordance with an illustrative embodiment. The process of FIG. 4 may be implemented by the SFP installed, mounted, inserted, or otherwise integrated with the CPE device. The process may begin by activating the SFP (step 402). The SFP may be activated once inserted into the CPE device, based on a user selection, or other local or remote network activation. For example, the CPE device may provide power and communications paths and circuits to the SFP.

Next, the SFP authenticates a service provider (step 404). The service provider may be authenticated utilizing a monitoring channel. For example, a particular VLAN may be associated with the SFP. The VLAN may be verified before the service provider is granted management access.

Next, the SFP authorizes communications services for the SFP based on a profile (step 406). In one embodiment, the SFP may be authorized based on a message, communication, or link received by the service provider from the SFP. The profile may specify the characteristics of the service the user is authorized to receive. For example, the SFP may authorize a 10 Mb connection to the service provider through a fiber optic connection.

Next, the SFP performs network testing and network monitoring as necessary (step 408). The network testing may include performing loop backs from the SFP. The network monitoring includes analysis and measurements of data traffic. The network monitoring does not include monitoring the contents of packages. For example, the number of packets received may be measured and recorded for reporting to the service provider. This information may be utilized to adjust networks, sell additional services, and ensure that SLAs or other performance guarantees are being met or exceeded.

Figure 5:
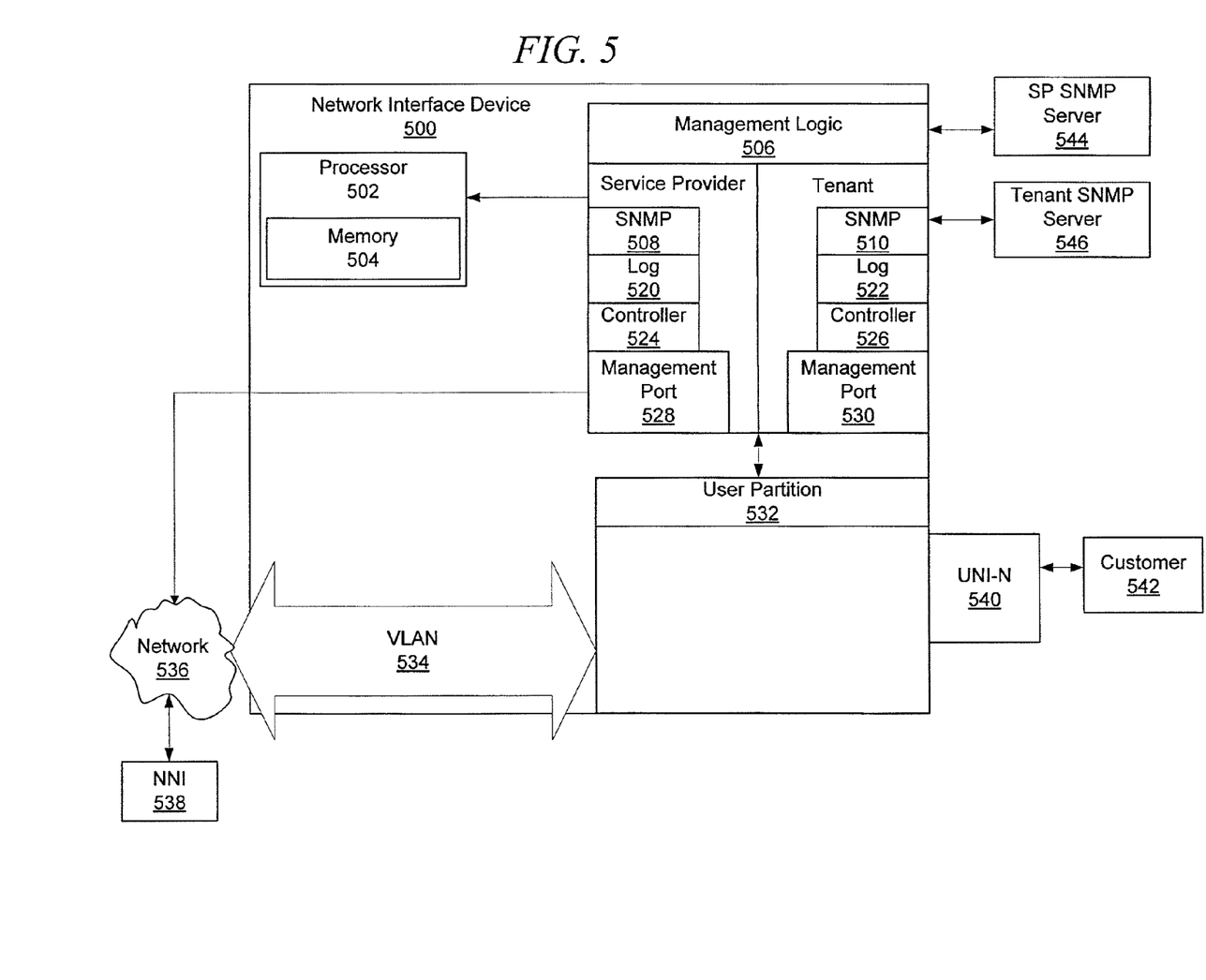
FIG. 5 is a block diagram of a network interface device (NID) in accordance with an illustrative embodiment.

FIG. 5 is a block diagram of a network interface device ("NID") 500 in accordance with an illustrative embodiment. The NID 500 may include a processor 502, a memory 504, management logic 506, SNMP 508 and 510, logs 520 and 522, controllers 524 and 526, management ports 528 and 530, user partition 532, and VLAN 534. The NID 500 may further communicate with a network 536, a NNI 538, a UNI-N 540, a customer 542, and service provider SNMP server 544, and a tenant SNMP server 546. FIG. 5 may include components, elements, and other devices, such as those previously described for the CPE 200 of FIG. 2. The NID 500 may be operable to separate control and functionality for one or more service providers, out-of-franchise service providers, and users. For purposes of simplicity, the service provider is the owning operator or party with control of the NID 500 and the user is the customer, tenant, third party service provider, or party that is utilizing a portion or partition of the NID 500. The user of the NID 500 by the user may be according to one or more service agreements or understandings.

In one embodiment, the management logic 506, VLAN 534, and user partition 532 represent software elements and modules that may be stored in the memory 504 for execution by the processor 502. In another embodiment, the management logic 506 may represent an ASIC, communications chip or chipset, digital logic, or FPGA. The controller may allow the service provider to control operation and functionality of the NID 500. The management port 528 may send and receive communications to the service provider or service provider element, such as the network 536 and NNI 538.

Similarly, the controller 526 may allow a user to remotely control operation, services, functions, and management of the user partition 532. The user partition 532 may include any number of ports and operational elements of the NID 500. In one embodiment, the user partition 532 or user domain elements may include a name for identifying the demarcation point. The management logic 506 may store preferences, settings, and configurations for both the service provider and the user. In one embodiment, the user partition 532 is one of multiple partitions associated with multiple users. The management port 528 may utilize a master identifier or key to authorize access to all aspects of the NID 500, including the user partition 512. Similarly, the customer may set identifiers or keys for establishing management and control authorizations. The NID 500 may allow a service provider to provide a user with remote configuration capabilities without using a separate CPE device dedicated to the user.

In one embodiment, the partitions create a set of tenet, user, or customer controls that restrict the owning operator of the NID 500 from seeing inside the user partition 532 being managed by the user. The user has control over locking the user partition settings for read and write access by the service provider. In a second embodiment, the owning agency or service provider has a over-ride key that allows the service provider to access the user partition 532 without permission or control being provided by the user. In on embodiment, the utilization and access of the NId 500 by both the user and the owning agency is recorded in separate log files. In another embodiment, use of the "over-ride" key by the service provider forces all activities in the user partition 512 to be logged on the tenant log, such as log 520.

In one embodiment, the user may establish permissions and authorized access for parties associated with the user. The user may also lock out all changes or specific users from accessing the user partition 532 to ensure that the user partition 532 functions as configured by the user. In one embodiment, the user may lock out all parties from accessing the user partition 532 except for a network operator authorized by the user. As a result, the service provider must override the permissions set by the user to access the user partition 532. The restricted access to the user partition 532 may encourage enhanced communication and coordination for hardware, software, and firmware updates for the NID 500.

If the service provider overrides or otherwise circumvents the permissions, settings, and configurations set by the user, the logs 520 and/or 522 may record actions and activities performed by the service provider that relate to or affect the user partition 532. In one embodiment, the SNMP 508 and 510 may send an SNMP message or communication to the service provider SNMP server 544 and tenant SNMP server 546, respectively. In another embodiment, the message, status indicator, state flag, or other indicator of an override and changes may be sent to an element management system (EMS).

In one embodiment, the logs 520 and 522 may be a logs that store activities and actions for the service provider and user. For example, the logs 520 and 522 may store activities by the service provider that affect the user partition 532 for subsequent review by the user. The log may ensure that all override activities conform to agreements and generally accepted business, technical and industry practices, laws, standards, policies, and procedures. Parties accessing the NID 500 including the service provider, out of franchise service provider, and other users may have a record of changes made for determining how to react to the changes.

The NID 500 may communicate with the UNI-N 540 and subsequently with the user 542. In one embodiment, the UNI-N 540 may provide a physical port for Ethernet communications to the user 542. The user 542 may represent any number of client devices, network, or communications systems, equipment, or devices, such as a UNI-C. The NID 500 may similarly store a previous and current configuration of the NID 500 including hardware, firmware, and software information. In one embodiment, the NID 500 may store previous software configurations or a link to previous software configurations in case changes cause failures within the NID 500.

In one embodiment, the test status of the NID 500, such as loop backs and operation statistics, may be read by both the user and the service provider. Similarly, operation states including up or down, loss, reset, configuration freezes (i.e., operational lock outs), unauthorized login attempts, security attacks, and other similar happenings may be sent at power up or at the time the event occurs to the service provider, user, and/or all parties utilizing the NID 500. In one embodiment, the events may be coded and associated with a flag for communication to the service provider and user.

Figure 6:
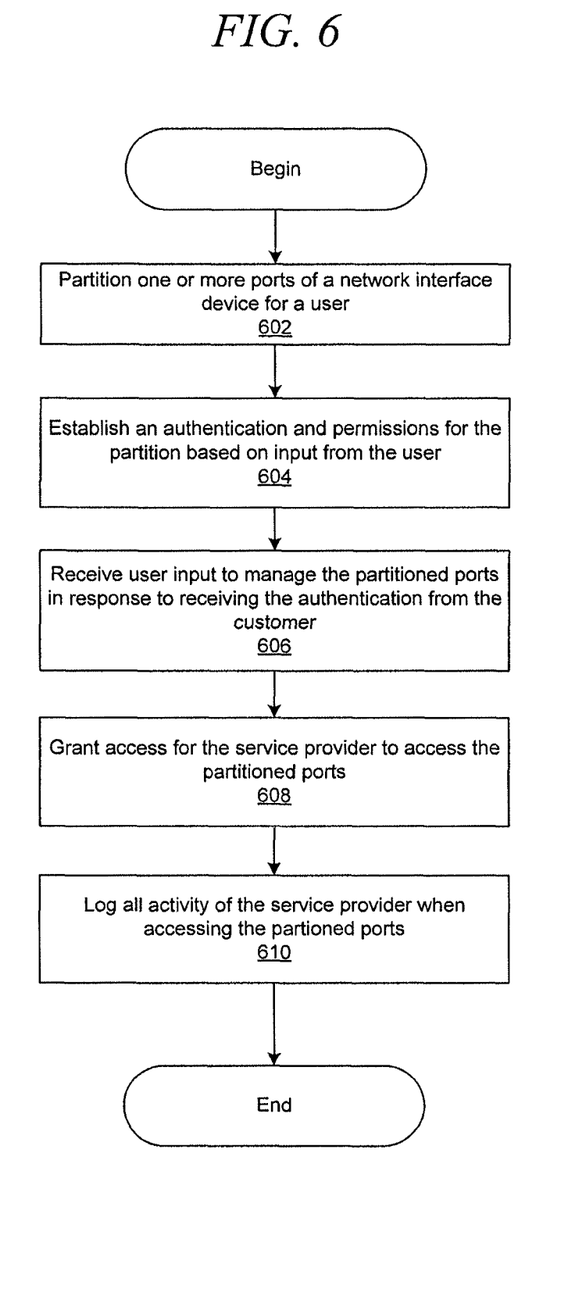
FIG. 6 is a flowchart of a process for operating the NID in accordance with an illustrative embodiment.

FIG. 6 is a flowchart of a process for operating the NID in accordance with an illustrative embodiment. The process of FIG. 6 may be implemented by the NID, the CPE, or other similar network device. The process may begin by partitioning one or more ports of the NID for a user (step 602). In one embodiment, the NID may be partitioned for a single user or tenant. In another embodiment, the NID may be partitioned for multiple users. For example, one or more ports may be associated with multiple users based on an agreement between the users and the service provider. The service provider may have previously established the NID and EMS support.

Next, the NID establishes authentication and permission for the partition based on input from the user (step 604). The authentication may include a designated management channel which may include a VLAN, tunnel, or firewall settings. The authentication may also include a password specified by the user for one or more parties or individuals associated with the user. The user may also establish permissions in step 604. The permissions may specify the functional and operational control granted to parties that may attempt to access the partition. In one embodiment, the permission may include settings for no permissions allowed, read-only permissions allowed, and read and write permissions allowed. As a result, the user may establish the organization, individual, system, equipment, and devices that may access the partition within the NID. In particular, during step 604, the user may lock out the service provider and other parties from managing, reconfiguring, or otherwise accessing the partition. As a result, the user has increased control, access to, and utilization of the partition of the NID. The service provider may also generate a domain for the partition dedicated to the user and give it a unique name known to both the user and the service provider.

Next, the NID receives user import to manage the partition ports in response to receiving the authentication from the user (step 606). The user may access the partition or the associated port at any time to manage or control that portion of the NID. For example, the NID may verify an identifier associated with a VLAN the user utilizes to access the NID based on authentication of the user full control and all available options may be made to the user.

Next, the NID grants access for the service provider to access the partition ports based on an override command (step 608). Based on the established permissions, the user may have configured the NID to deny or restrict the service provider access to the NID. The service provider may be required to override the permissions and configurations of the user in order to access the partitions port. For example, the service provider may need to replace a hardware element, such as a processor or network interface card within the NID. As a result, the service provider may provide the override command to reconfigure the NID, and particularly, the partitioned portion, as needed.

The NID logs all activity of the service provider when accessing the partitioned ports (step 610). The activity of the service provider is logged so that the user may independently determine actions and activities performed by the service provider. For example, the user may ensure that the actions and activities are in accordance with the agreements between the service provider and user. In one embodiment, the logged activity in step 608 may be communicated to one or more devices associated with the service provider and the user. For example, the log may be communicated to SNMP servers of the user and the service provider.

In another embodiment, the NID may include a log accessible to the service provider and the user. The log may be stored on the NID or a neutral location to prevent deletion or destruction. For example, the log may not be deleted unless the NID or user partition are completely deleted or destroyed. For example, if the user fails to pay the service provider for a period of months, the service provider may delete the partition and the log associated with the partition after reasonable notice. The log provides an open process and access to important information that may further strengthen the technical and service relationship and agreements between the service provider and the user.

The previous detailed description is of a small number of embodiments for implementing the invention and is not intended to be limiting in scope. One of skill in this art will immediately envisage the methods and variations used to implement this invention in other areas than those described in detail. The following claims set forth a number of the embodiments of the invention disclosed with greater particularity.

What is claimed as new and desired to be protected by Letters Patent of the United States is:

1. A method for managing control of a network interface device (NID), the method comprising:
    partitioning one or more ports of the NID for utilization by a user;
    establishing permissions for management of the one or more ports of the NID, wherein the permissions enable a user to deny a service provider access to the one or more ports of the NID based on the permissions;

granting access for the service provider to the one or more portions of the NID in response to receiving an authorized override command from the service provider; and logging activities performed by the service provider in the one or more portions of the NID in response to receiving the authorized override command from the service provider.

2. The method according to claim 1, wherein the service provider is prevented from accessing the one or more ports of the NID unless the authorized override command is received by the NID.

3. The method according to claim 1, wherein the authorized override command is received through a management channel.

4. The method according to claim 1, wherein each of the one or more ports is associated with a distinct user.

5. The method according to claim 1, further comprising:
receiving a request from the user to access the one or more ports of the NID; and
granting access for the user to manage the one or more ports in response to authenticating a request from the user.

6. The method according to claim 1, further comprising:
sending an network message indicating the logged activities from the one or more ports of the NID to one or more servers in response to receiving the authorized override command.

7. The method according to claim 1, wherein receiving the override command forces the NID to log all activities by the service provider.

8. The method according to claim 1, wherein a plurality of parties associated with the NID are communicated the logging activities in response to the override command being received by the NID.

9. The method according to claim 1, wherein the logged activities are utilized by the user to determine whether the service provider complied with written agreements or applicable laws.

10. The method according to claim 1, further comprising:
storing the logged activities at a remote location from the NID.

11. A network interface device (NID) comprising:
a communications converter utilizing a management channel for communicating with a user and service providers through one or more physical connections; and
a management logic in communication with the management channel, the management logic further including:
partitioning one or more ports of the NID for utilization by a user;
a user controller operable to control operation of one or more ports of the NID, wherein the user controller is configured by the user to set restrictions for the one or more ports including restricting access to the one or more portions of the NID by the service providers and granting access of the one or more ports of the NID to one or more of the service providers in response to receiving an override request from the one or more of the service providers to override the restrictions; and a log operable to log activities associated with one of the service providers overriding the restrictions.

12. The NID according to claim 11, wherein the management channel ensures secured communications between the user and the service providers.

13. The NID according to claim 11, wherein the log includes a master log accessible by the user, wherein the master log is not deletable or modifiable by the service providers.

14. The NID according to claim 13, wherein the log is communicated to the one or more service providers associated with the overriding the restrictions and the user utilizing a message.

15. The NID according to claim 11, wherein a plurality of parties associated with the NID are communicated the logging activities in response to the override command being received by the NID.

16. The NID according to claim 11, wherein the restrictions are set by the user for the service providers.

17. A network interface device (NID) comprising:
a processor operable to execute a set of instructions;
a memory in communication with the processor, the memory operable to store the set of instructions, wherein the set of instructions are executed to:
partition one or more ports of the NID for utilization by a user;
establish permissions for management of one or more ports of the NID based on user input, wherein the permissions allow the user to deny a service provider access to the one or more ports of the NID;
restrict access to the one or more ports based on the permissions;
grant access for the service provider to the one or more ports of the NID in response to receiving an override request from the service provider;
log activities performed by the service provider in the one or more ports of the NID in response to receiving the override request; and
communicate the logged activities to at least the user.

18. The NID according to claim 17, wherein the set of instructions are further executed to:
receiving a request to access the one or more ports of the NID; and
granting access for the user to manage the one or more ports in response to authenticating the request from the user.

19. The NID according to claim 17, wherein the set of instructions are further executed to:
store the logged activities at a remote location from the NID, wherein receiving the override command forces the NID to log all activities by the service provider.

20. The NID according to claim 17, wherein the permissions are any of full access, read-only, and read and configure, and wherein a plurality of parties associated with the NID are communicated the logged activities in response to the override command being received by the NID.

* * * * *